June 17, 1941.  W. H. MILLER  2,245,699

SHOCK STRUT

Filed Dec. 12, 1936

Inventor

William H. Miller

By Semmes & Semmes
Attorney

Patented June 17, 1941

2,245,699

UNITED STATES PATENT OFFICE 2,245,699

SHOCK STRUT

William H. Miller, Philadelphia, Pa., assignor, by mesne assignments, to Bendix Aviation Corporation, South Bend, Ind., a corporation of Delaware Application December 12, 1936, Serial No. 115,597

1 Claim. (Cl. 267—34)

This invention relates to shock struts, and more particularly to shock struts employing telescopic tubular members, wherein means are provided to prevent relative rotation between the members.

In aircraft landing gears, independent individual suspension of each landing wheel is employed to a considerable extent, the fuselage and individual wheels being connected by a strut preferably, comprising telescopic tubular members having some arrangement to absorb shock. In such an arrangement, one of the telescopic members may be rigidly secured and braced to the fuselage, and the other carry the wheel, but in order to transmit torsional stresses occurring at the wheel due to ground irregularities, braking, etc., means must be provided for transmitting torsional stresses from one member to the other.

It is a feature or object of the present invention to provide a structure wherein relative rotation between telescopic members is prevented without interfering with the relative reciprocatory shock absorbing movement between the cylinders.

Another object of the invention is to provide, in a shock strut of the telescopic type, spline means for preventing relative rotation between the members.

A further object of the invention is to provide, in a shock strut of the telescopic tubular type, spline means for preventing relative rotation between the members, the spline means being enclosed within the members.

Still another object of the invention is to provide, in a shock strut of the telescopic tubular type, spline means between the members protected from exposure and immersed in the shock absorbing liquid within the strut members, for lubrication.

Yet another object of the invention is to provide, in a shock strut, splines evenly distributed around the interengaging surfaces of the members, the splines being exposed to the shock absorbing liquid used in the strut to provide free lubricated axial movement and a broad protected bearing surface against relative rotation between the members.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claim.

In the drawing, wherein similar reference characters refer to similar parts throughout the several views.

Figure 1:
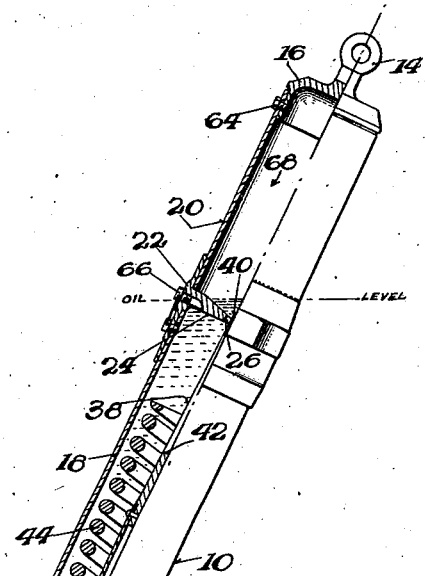
Fig. 1 is illustrative of a side view of the shock strut in its extended position, the same being shown with a quarter section removed.
Figure 2:
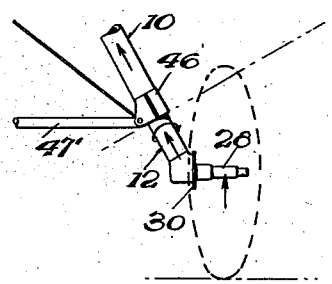
Fig. 2 is a front view of the strut as mounted in practice with attachment braces.
Figure 3:
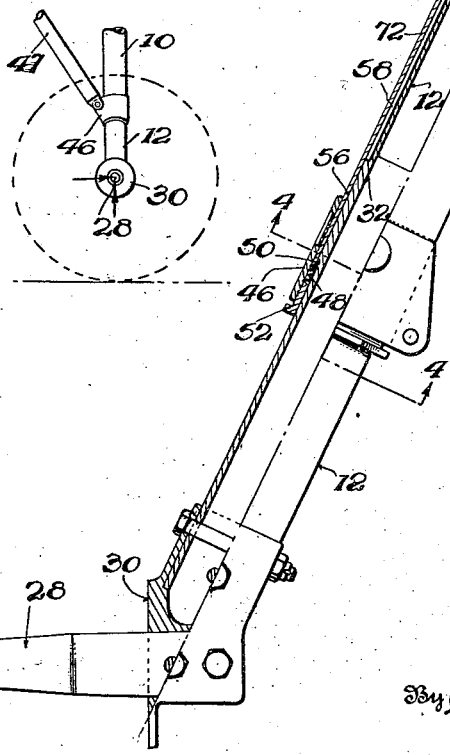
Fig. 3 is a side view of the lower portion of the strut as shown in Fig. 2.
Figure 4:
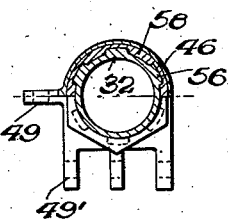
Fig. 4 is a broken cross-section through the strut taken on the line 4—4 of Fig. 1.

Referring to the drawing, and particularly Fig. 1, there will be seen telescopic casings 10 and 12, the upper casing 10 being outside of the lower casing 12, and being adapted for securing to an aircraft fuselage by any suitable means such as the eye 14 in the end cap 16. The upper casing, as shown is divided in two sections 18 and 20, secured together by a sleeve 22 having a diaphragm 24 centrally located therein with a central orifice 26, the purpose of which will be described hereinafter with more particularity.

The inner casing 12 is provided at its lower extremity with a stub axle 28, and flange 30, adapted to receive a wheel and brake (not shown) as will be well understood in the art. The upper end is provided with a head portion 32 adapted to reciprocate within the outer cylinder and on its extreme upper end is provided with a head cap 34 forming a sliding bearing 36 on the interior of the outer cylinder 10. Centrally positioned on the head cap is a tubular support 37 having at its end a metering pin 38 adapted to cooperate with the herein before described diaphragm and orifice 26. The metering pin may obviously be of any preferred shape and may, if a uniform orifice is desired, be dispensed with. The pin shown is tapered in form, the small end 40 lying adjacent the orifice when the strut is extended and the base 42 approaching the orifice when the strut is compressed.

To support the load of the plane while taxiing, a spring 44 is also carried on the head cap 34 and is adapted to engage the under side of the diaphragm 24 when the strut has been compressed to a certain degree by the initial shock of landing.

The outer casing at its lower end is provided with an outside sleeve 46 extending below the end thereof to provide a space for packing material 48, the latter being positioned between an L shaped ring 50 seated against the end of member 10, and a packing nut 52 threaded into the sleeve 46. The nut 52 and the smooth exterior surface on the lower end of the inner member 12, and the head cap 34 and the smooth interior surface of the upper portion 18 of the outer casing form sliding bearings sufficiently spaced to prevent buckling. Bracing members 47 and 47' are attached to lugs 49 and 49', the latter integrally secured to the sleeve 46.

To prevent relative rotation between the casings, and transmit torsional stresses from the lower inner casing 12 to the upper outer casing 10, the inner casing 12 is provided with short external splines 56 engaging with interior splines 58 in the lower portion of the outer casing 10. The upper end 60 of the splines 58 may act as a limiting means governing maximum extension of the strut by engaging with the shoulder formed by the under edge 62 of the head cap 34.

In practice the strut is filled with oil or other liquid through filler plug 64 to a level which may be determined by removal of plug 66 and filling until bleeding takes place, this level being determined with the strut extended and not loaded. During the compression stroke, as while landing, air may be entrapped in the top space 68 or a vent may be provided, in which latter case the entire taxiing load is carried by the spring after the initial shock of landing has taken place. In practice leakage of shock absorbing liquid past the cup washer 70 into the interrupted annular space 72 affords lubrication to the splines, since the liquid generally contains considerable oil. Escape beyond the splines is prevented by the packing 48. In the event that this space becomes full of liquid, on the expansion stroke, the liquid may flow upward past the cup washer into the spring chamber.

There is thus provided a strut having reciprocating members splined against rotation in a manner such as to reduce friction and wear to a minimum, the splines being protected from the elements of weather, and being subjected to lubrication by the liquid within the strut.

Though a single embodiment of the invention has been illustrated and described, it is to be understood that the invention is not limited thereto but may be embodied in various alternative forms. As many changes in construction and arrangement of parts may be made without departing from the spirit of the invention, as would be apparent to those skilled in the art, reference will be had to the appended claim for a definition of the limits of the invention.

What is claimed is:

A shock strut comprising an outer member, raised internal splines on a portion of the inner surface of said outer member, a telescoping inner member, external splines on the internal member, matching and interengaging the internal splines of the outer member, and an unsplined portion on said inner member having an axial size substantially the same as the outer surfaces of the external splines, adapted to act as a bearing surface for the unsplined portion on the outer member, and to act as a stop to relative movement between the two members.

WILLIAM H. MILLER.